(12) United States Patent
Zhou et al.

(10) Patent No.: US 10,508,193 B2
(45) Date of Patent: *Dec. 17, 2019

(54) PRESSURE-SENSITIVE ADHESIVES INCLUDING EXPANDABLE GRAPHITE

(71) Applicant: FIRESTONE BUILDING PRODUCTS CO., LLC, Nashville, TN (US)

(72) Inventors: Wensheng Zhou, Carmel, IN (US); Michael J. Hubbard, Murfreesboro, TN (US); Joseph Carr, Indianapolis, IN (US)

(73) Assignee: Firestone Building Products Co., LLC, Nashville, TN (US)

( * ) Notice: Subject to any disclaimer, the term of this patent is extended or adjusted under 35 U.S.C. 154(b) by 56 days.

This patent is subject to a terminal disclaimer.

(21) Appl. No.: 15/613,962

(22) Filed: Jun. 5, 2017

(65) Prior Publication Data

US 2017/0267896 A1 Sep. 21, 2017

Related U.S. Application Data

(63) Continuation of application No. 14/441,286, filed as application No. PCT/US2013/068902 on Nov. 7, (Continued)

(51) Int. Cl.
*B32B 5/16* (2006.01)
*B32B 37/24* (2006.01)
(Continued)

(52) U.S. Cl.
CPC ............... *C08K 7/24* (2013.01); *B32B 5/022* (2013.01); *B32B 5/16* (2013.01); *B32B 7/06* (2013.01);
(Continued)

(58) Field of Classification Search
CPC .. B32B 5/022; B32B 5/16; B32B 7/06; B32B 7/12; B32B 9/007; B32B 25/042; B32B 25/047; B32B 25/10; B32B 25/14; B32B 27/08; B32B 27/12; B32B 27/14; B32B 27/18; B32B 37/12; B32B 37/1207; B32B 37/153; B32B 37/24; B32B 2037/1215; B32B 2037/1223; B32B 2037/268; B32B 2250/03; B32B 2255/10; B32B 2255/26; (Continued)

(56) References Cited

U.S. PATENT DOCUMENTS 3,719,608 A 3/1973 Olstowski
5,516,817 A 5/1996 Slusher et al.
(Continued)

FOREIGN PATENT DOCUMENTS

WO WO 2009/006168 A1 1/2009

OTHER PUBLICATIONS

International Search Report for PCT/US2013/068902 dated Apr. 16, 2014.

*Primary Examiner* — Michael A Tolin
(74) *Attorney, Agent, or Firm* — Brian D. McAlhaney; Arthur M. Reginelli

(57) ABSTRACT

A building material comprising a substrate layer and a pressure-sensitive adhesive layer, where the pressure-sensitive adhesive layer includes expandable graphite.

8 Claims, 3 Drawing Sheets

Related U.S. Application Data 2013, now Pat. No. 9,683,135, which is a continuation-in-part of application No. 13/830,882, filed on Mar. 14, 2013, now Pat. No. 8,968,853.

(60) Provisional application No. 61/723,354, filed on Nov. 7, 2012.

(51) Int. Cl.

| | |
|---|---|
| *C08K 3/016* | (2018.01) |
| *C08K 3/04* | (2006.01) |
| *E04D 5/10* | (2006.01) |
| *C08K 7/24* | (2006.01) |
| *B32B 15/06* | (2006.01) |
| *B32B 15/08* | (2006.01) |
| *B32B 25/08* | (2006.01) |
| *B32B 25/10* | (2006.01) |
| *B32B 25/18* | (2006.01) |
| *B32B 27/08* | (2006.01) |
| *B32B 27/12* | (2006.01) |
| *B32B 27/18* | (2006.01) |
| *B32B 27/30* | (2006.01) |
| *B32B 9/04* | (2006.01) |
| *B32B 9/00* | (2006.01) |
| *C09J 7/38* | (2018.01) |
| *C09J 7/40* | (2018.01) |
| *C09J 7/22* | (2018.01) |
| *B32B 5/02* | (2006.01) |
| *B32B 7/06* | (2019.01) |
| *B32B 7/12* | (2006.01) |
| *B32B 15/082* | (2006.01) |
| *B32B 15/085* | (2006.01) |
| *B32B 15/20* | (2006.01) |
| *B32B 25/04* | (2006.01) |
| *B32B 25/06* | (2006.01) |
| *B32B 25/12* | (2006.01) |
| *B32B 25/14* | (2006.01) |
| *B32B 25/16* | (2006.01) |
| *B32B 25/20* | (2006.01) |
| *B32B 27/06* | (2006.01) |
| *B32B 27/10* | (2006.01) |
| *B32B 27/22* | (2006.01) |
| *B32B 27/28* | (2006.01) |
| *B32B 27/32* | (2006.01) |
| *B32B 27/36* | (2006.01) |
| *B32B 29/00* | (2006.01) |
| *B32B 37/12* | (2006.01) |
| *B32B 37/26* | (2006.01) |

(52) U.S. Cl.
CPC .............. *B32B 7/12* (2013.01); *B32B 9/007* (2013.01); *B32B 9/045* (2013.01); *B32B 15/06* (2013.01); *B32B 15/08* (2013.01); *B32B 15/082* (2013.01); *B32B 15/085* (2013.01); *B32B 15/20* (2013.01); *B32B 25/04* (2013.01); *B32B 25/042* (2013.01); *B32B 25/06* (2013.01); *B32B 25/08* (2013.01); *B32B 25/10* (2013.01); *B32B 25/12* (2013.01); *B32B 25/14* (2013.01); *B32B 25/16* (2013.01); *B32B 25/18* (2013.01); *B32B 25/20* (2013.01); *B32B 27/06* (2013.01); *B32B 27/08* (2013.01); *B32B 27/10* (2013.01); *B32B 27/12* (2013.01); *B32B 27/18* (2013.01); *B32B 27/22* (2013.01); *B32B 27/285* (2013.01); *B32B 27/302* (2013.01); *B32B 27/306* (2013.01); *B32B 27/308* (2013.01); *B32B 27/32* (2013.01); *B32B 27/36* (2013.01); *B32B 29/002* (2013.01); *C08K 3/016* (2018.01); *C09J 7/22* (2018.01); *C09J 7/38* (2018.01); *C09J 7/383* (2018.01); *C09J 7/387* (2018.01); *C09J 7/40* (2018.01); *E04D 5/10* (2013.01); *B32B 37/24* (2013.01); *B32B 2037/1223* (2013.01); *B32B 2037/268* (2013.01); *B32B 2250/03* (2013.01); *B32B 2255/10* (2013.01); *B32B 2255/12* (2013.01); *B32B 2255/26* (2013.01); *B32B 2262/0253* (2013.01); *B32B 2262/0276* (2013.01); *B32B 2264/108* (2013.01); *B32B 2307/3065* (2013.01); *B32B 2307/546* (2013.01); *B32B 2307/5825* (2013.01); *B32B 2307/7242* (2013.01); *B32B 2307/7246* (2013.01); *B32B 2307/7265* (2013.01); *B32B 2307/732* (2013.01); *B32B 2307/738* (2013.01); *B32B 2307/748* (2013.01); *B32B 2405/00* (2013.01); *B32B 2419/04* (2013.01); *B32B 2419/06* (2013.01); *C08K 3/04* (2013.01); *C09J 2205/102* (2013.01); *C09J 2400/24* (2013.01); *C09J 2409/00* (2013.01); *C09J 2453/00* (2013.01); *Y10T 156/10* (2015.01); *Y10T 428/14* (2015.01); *Y10T 428/1405* (2015.01); *Y10T 428/1476* (2015.01); *Y10T 428/24802* (2015.01); *Y10T 428/26* (2015.01); *Y10T 428/28* (2015.01); *Y10T 428/2804* (2015.01); *Y10T 428/2835* (2015.01); *Y10T 428/2848* (2015.01); *Y10T 428/2852* (2015.01); *Y10T 428/2878* (2015.01); *Y10T 428/2883* (2015.01); *Y10T 428/30* (2015.01); *Y10T 442/2648* (2015.04)

(58) Field of Classification Search
CPC ........ B32B 2260/025; B32B 2264/108; B32B 2307/3065; B32B 2307/712; B32B 2307/7242; B32B 2307/7246; B32B 2307/7265; B32B 2405/00; B32B 2419/06; B32B 25/08; C08K 3/016; C08K 3/04; C09J 7/38; C09J 7/383; C09J 7/385; C09J 7/387; C09J 7/40; C09J 2201/36; C09J 2201/606; C09J 2205/102; C09J 2400/00; C09J 2400/10; D06N 5/00; E04D 5/02; E04D 5/10; E04D 5/148; Y10S 428/92; Y10S 428/921; Y10T 428/14; Y10T 428/1405; Y10T 428/1476; Y10T 428/28; Y10T 428/2848; Y10T 428/2852; Y10T 428/2878; Y10T 428/2883; Y10T 428/2891; Y10T 442/2648

See application file for complete search history.

(56) References Cited

U.S. PATENT DOCUMENTS

| | | | |
|---|---|---|---|
| 6,084,008 A | 7/2000 | Liu | |
| 6,207,085 B1 | 3/2001 | Ackerman | |
| 6,410,137 B1 | 6/2002 | Bunyan | |
| 6,436,510 B1* | 8/2002 | Heidel | ................ D06N 3/0056 428/142 |
| 6,544,596 B2 | 4/2003 | Clemens et al. | |
| 6,706,793 B2 | 3/2004 | Abu-Isa et al. | |
| 6,849,338 B2 | 2/2005 | Clemens et al. | |
| 7,514,142 B2 | 4/2009 | Husemann et al. | |
| 7,605,188 B2 | 10/2009 | Loh et al. | |
| 7,677,009 B2 | 3/2010 | Bowman | |
| 7,833,575 B2 | 11/2010 | Gupta | |
| 7,878,301 B2 | 2/2011 | Gross et al. | |
| 8,178,449 B2 | 5/2012 | La Vietes et al. | |

(56) References Cited

U.S. PATENT DOCUMENTS

| | | | |
|---|---|---|---|
| 10,336,887 B2 * | 7/2019 | Zhou | B32B 37/24 |
| 2003/0195287 A1 | 10/2003 | Fisher | |
| 2003/0203145 A1 | 10/2003 | Zanchetta | |
| 2004/0121152 A1 | 6/2004 | Toas | |
| 2005/0139126 A1 | 6/2005 | Khan et al. | |
| 2005/0145139 A1 | 7/2005 | Khan et al. | |
| 2005/0257875 A1 | 11/2005 | Khan et al. | |
| 2006/0144012 A1 | 7/2006 | Manning et al. | |
| 2006/0160978 A1 | 7/2006 | Gupta et al. | |
| 2006/0217451 A1 | 9/2006 | Bonapersona | |
| 2006/0240224 A1 | 10/2006 | Khan et al. | |
| 2006/0273290 A1 | 12/2006 | Khan et al. | |
| 2008/0102243 A1 | 5/2008 | Gupta | |
| 2008/0184651 A1 | 8/2008 | Bowman | |
| 2008/0188590 A1 | 8/2008 | Gupta | |
| 2009/0309077 A1 | 12/2009 | Gupta et al. | |
| 2009/0326117 A1 | 12/2009 | Benussi et al. | |
| 2010/0167013 A1 | 7/2010 | Cruz et al. | |
| 2011/0011021 A1 | 1/2011 | La Vietes | |
| 2011/0073239 A1 | 3/2011 | Manning et al. | |
| 2011/0173924 A1 | 7/2011 | Ambrose, Jr. et al. | |
| 2011/0185656 A1 | 8/2011 | Klein | |
| 2011/0313084 A1 | 12/2011 | Furar et al. | |
| 2012/0009407 A1 | 1/2012 | Peeler et al. | |
| 2012/0022176 A1 | 1/2012 | Stahl et al. | |
| 2012/0100289 A1 | 4/2012 | Egan et al. | |
| 2012/0174508 A1 | 7/2012 | Brooks et al. | |
| 2012/0189838 A1 | 7/2012 | Pellacani et al. | |
| 2012/0266553 A1 | 10/2012 | Shiao et al. | |
| 2013/0036714 A1 | 2/2013 | Bolton et al. | |
| 2014/0013693 A1 * | 1/2014 | Zhou | B32B 5/16 52/408 |
| 2015/0307748 A1 * | 10/2015 | Zhou | C09J 7/21 428/41.3 |
| 2016/0347033 A1 * | 12/2016 | Zhou | B32B 5/16 |
| 2017/0298201 A1 * | 10/2017 | Zhou | B32B 5/16 |
| 2018/0326702 A1 * | 11/2018 | Zhou | B32B 5/16 |

* cited by examiner

PRESSURE-SENSITIVE ADHESIVES INCLUDING EXPANDABLE GRAPHITE

This application is a continuation of U.S. application Ser. No. 14/441,286, filed on May 7, 2015, now U.S. Pat. No. 9,683,135, which is the National Stage of International Application No. PCT/US2013/068902, filed Nov. 7, 2013, which is a continuation in part of U.S. application Ser. No. 13/830,882, now U.S. Pat. No. 8,968,853, filed on Mar. 14, 2013, which claims the benefit of U.S. Provisional Application No. 61/723,354, filed on Nov. 7, 2012; all of which are incorporated herein by reference.

FIELD OF THE INVENTION

Embodiments of the present invention are directed toward pressure-sensitive adhesives that include expandable graphite. These adhesives are useful for adhering construction materials, such as roofing membranes, moisture, air and vapor barriers, and underlayments, to various substrates while providing the construction materials with improved fire and/or flame-spread resistance.

BACKGROUND OF THE INVENTION

Pressure-sensitive adhesives are employed in building materials. For example, as disclosed in Statutory Invention Record H1,735, roofing membranes, such as EPDM membranes, can be adhered to adjoining membranes or to a roof surface by an adhesive layer that is coated on the underside of the roofing membrane. The adhesive layer disclosed in this Invention Record includes a hydrogenated styrene-butadiene-styrene or hydrogenated styrene-isoprene-styrene block copolymer having a polystyrene content of from 20 to 40 percent by weight and an overall weight average molecular weight from 50,000 to 150,000, a polyphenylene ether resin having an intrinsic viscosity of less than 0.35 deciliters per gram or a high-softening point end-block reinforcing resin, and a tackifying resin.

Similarly, U.S. Publication No. 2003/0219564 discloses a single-ply roofing membranes that include a water impermeable membrane, such as an EPDM membrane, and a pressure-sensitive, hot-melt adhesive adhered to one side of the membrane. A release liner may be secured to the pressure-sensitive, hot-melt adhesive opposite of the water impermeable membrane.

There is a desire to improve the flame and fire resistance of building materials such as roofing membranes.

SUMMARY OF THE INVENTION

Embodiments of the invention provide a building material comprising a substrate layer and a pressure-sensitive adhesive layer, where the pressure-sensitive adhesive layer includes expandable graphite.

DETAILED DESCRIPTION OF ILLUSTRATIVE EMBODIMENTS

Figure 1:
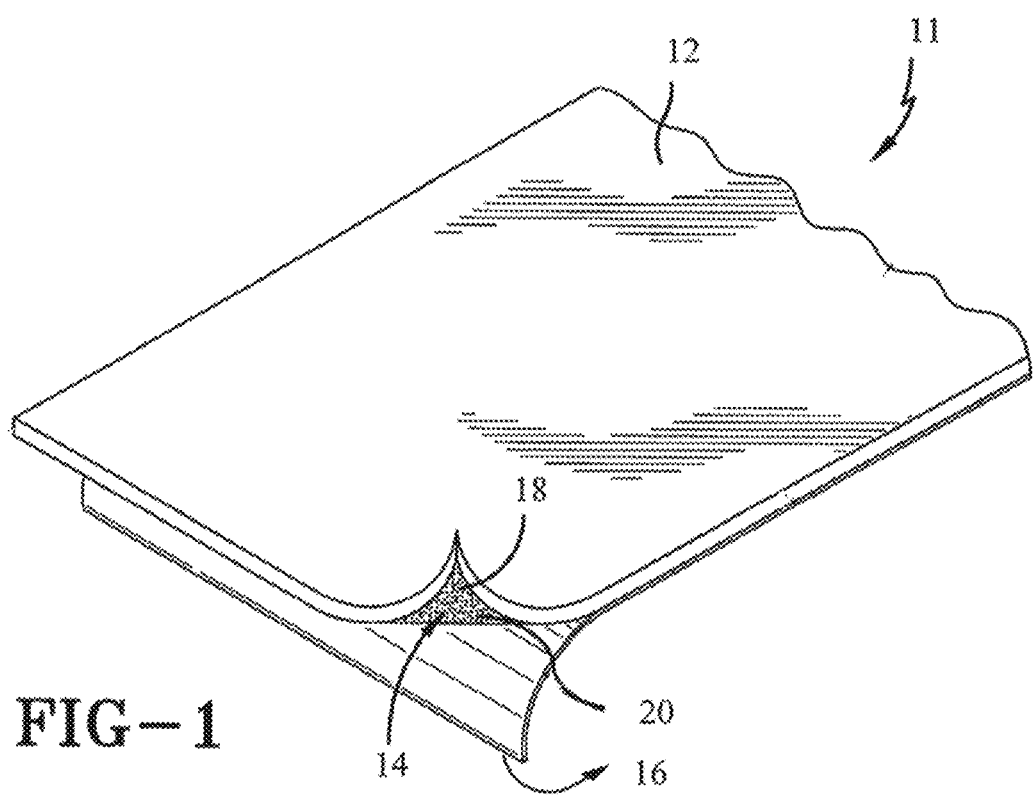
FIG. 1 is a perspective view of a membrane according to one or more embodiments of the present invention.

Embodiments of the present invention are based, at least in part, on the discovery of a pressure-sensitive adhesive composition containing expandable graphite. In one or more embodiments, the expandable graphite is dispersed within the constituents of the pressure-sensitive adhesive; in other words, the pressure-sensitive adhesive forms a matrix in which the expandable graphite is dispersed. In other embodiments, the expandable graphite is located within a region or layer within the pressure-sensitive adhesive where the expandable graphite is concentrated. In yet other embodiments, the expandable graphite is both dispersed within the pressure-sensitive adhesive and located within a concentrate layer or region. In particular embodiments, the pressure-sensitive adhesive composition is mated to a building material to provide a building material with increased flame and/or fire resistance while providing the building material with a mechanism for attachment. In one or more embodiments, the building material is advantageously a roofing membrane, and the composition of the present invention can be used to form a fully-adhered roofing system having improved flame-spread and/or fire resistance. In other embodiments, the building material is underlayment. In yet other embodiments, the building material is a moisture, vapor or air barrier.

Pressure-Sensitive Adhesive Composition

Practice of the present invention is not necessarily limited by the type of pressure-sensitive adhesive composition employed. In other words, the constituents that form the adhesive composition in which the expandable graphite is dispersed or otherwise located may include conventional constituents used to form pressure-sensitive adhesive compositions. Included among useful pressure-sensitive adhesives are holt-melt adhesives, which are flowable when heated to threshold temperatures, and solvent-borne adhesives, which include those compositions where the solids portion of the adhesive is dissolved or suspended in a solvent.

In one or more embodiments, the pressure-sensitive adhesive is characterized by a tack, as defined by the Standard Test Method for Tack of Pressure-Sensitive Adhesives by Rolling Ball (ASTM D3121-06), of less than 30 cm, in other embodiments less than 20 cm, and in other embodiments less than 10 cm.

In one or more embodiments, the pressure-sensitive adhesive is characterized by providing a minimum peel strength, as defined by the Standard Test Method for Peel Adhesion of Pressure-Sensitive Label Stocks at 90° Angle (ASTM D6252/D6252M-98(2011)), of at least 0.1 pli, in other embodiments at least 0.3 pli, and in other embodiments at least 0.5 pli.

In one or more embodiments, especially where the pressure-sensitive adhesive is a hot-melt adhesive, the pressure-sensitive adhesive composition may be characterized as a solid at temperatures below 200° F. (93.3° C.), in other embodiments below 190° F. (87.8° C.), in other embodiments below 180° F. (82.2° C.), and in other embodiments below 170° F. (76.7° C.). In these or other embodiments, the pressure-sensitive adhesive composition is characterized as a fluid above 200° F. (93.3° C.), in other embodiments above 250° F. (121° C.), in other embodiments above 300° F. (149° C.), and in other embodiments above 350° F. (177° C.).

Exemplary pressure-sensitive adhesive compositions that may be employed in practicing the present invention include those compositions based upon acrylic polymers, butyl rubber, ethylene vinyl acetate, natural rubber, nitrile rubber, silicone rubber, styrene block copolymers, ethylene-propylene-diene rubber, atatic poly-alpha olefins, and/or vinyl ether polymers. In combination with these base polymers, the pressure-sensitive adhesive compositions may include a variety of complementary constituents such as, but not limited to, tackifying resins, waxes, antioxidants, and plasticizers.

In particular embodiments, the pressure-sensitive adhesive compositions of the present invention include polystyrene block copolymers. These block copolymers include at least two types of blocks, which may be referred to as A and B blocks, where the A blocks represent blocks deriving from the polymerization of at least one vinyl aromatic monomer (e.g., styrene) and the B blocks derive from the polymerization of at least one conjugated diene monomer (e.g., butadiene). Exemplary vinyl aromatic monomer includes styrene, p-methylstyrene, α-methylstyrene, and Vinylnaphthalene. Examples of conjugated diene monomer include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene.

In particular embodiments, the block copolymers include at least two A blocks and at least one B block. For example, the use of A-B-A block copolymers is specifically contemplated. In one or more embodiments, the B block may be hydrogenated. In one or more embodiments, the B block is characterized by at least 75 percent hydrogenation, in other embodiments at least 85 percent hydrogenation, and in other embodiments at least 95 percent hydrogenation, where the percent hydrogenation refers to the number of original double bonds within the block reduced by hydrogenation. For example, a polymer block that is 95 percent hydrogenated includes 5 percent of the original double bonds. In one or more embodiments, the aromatic unsaturation within the A blocks is hydrogenated by less than 25 percent, in other embodiments less than 15 percent, and in other embodiments less than 5 percent.

In one or more embodiments, each A block has an number average molecular weight of at least 2 kg/mole, in other embodiments at least 5 kg/mole, and in other embodiments at least 25 kg/mole. In these or other embodiments, each A block has a number average molecular weight of less than 125 kg/mole, in other embodiments less than 75 kg/mole, and in other embodiments less than 50 kg/mole.

In one or more embodiments, each B block has a number average molecular weight of at least 10 kg/mole, in other embodiments at least 30 kg/mole, and in other embodiments at least 50 kg/mole. In these or other embodiments, each A block has an number average molecular weight of less than 250 kg/mole, in other embodiments less than 175 kg/mole, and in other embodiments less than 125 kg/mole.

Exemplary styrene block copolymers include styrene-butadiene-styrene block copolymer, hydrogenated styrene-butadiene-styrene block copolymer (which may also be referred to as styrene-ethylene/butene-styrene block copolymer), styrene-isoprene-styrene block copolymer, and hydrogenated styrene-isoprene-styrene block copolymer (which may also be referred to as styrene-ethylene/propylene-styrene block copolymer). For ease of description, these polymers may be referred to, respectively, as S-B-S block copolymer, S-E/B-S block copolymer, S-I-S block copolymer, and S-E/P-S block copolymer.

The polystyrene block copolymer-based, pressure-sensitive adhesive compositions used in this invention may also include a modifying resin. In one or more embodiments, modifying resins include end-block modifying resins and/or mid-block modifying resins. As is known in the art, end-block modifying resins include those resins that modify and/or reinforce the styrene blocks of the block copolymer. It is believed that these end-block modifying resins form pseudo cross links between polymer chains. In one or more embodiments, these end-block resins are characterized by a ring and ball softening point of at least 90° C., in other embodiments at least 100° C., in other embodiments at least 110° C., in other embodiments at least 120° C., in other embodiments at least 140° C., and in other embodiments at least 160° C. Exemplary end-block modifying resins include coumarone-indene resins, poly-α-methylstyrene resins, polystyrene resins, vinyl toluene-α-methylstyrene copolymer resins, and polyindene resins. In these or other embodiments, mid-block modifying resins are employed. As is known in the art, mid-block modifying resins include those resins that modify and/or reinforce the diene blocks of the block copolymer. It is believed that these mid-block modifying resins form pseudo cross links between polymer chains. In one or more embodiments, mid-block modifying resins include aliphatic resins such as pentene-type resins, terpene resins, and cycloaliphatic resins.

Exemplary polyphenylene ether resins, such as polyphenylene oxide, may also be used. In one or more embodiments, these resins are characterized by an intrinsic viscosity of less than 0.4 dl/g, in other embodiments less than 0.35 dl/g, and in other embodiments less than 0.2 dl/g, when measured in solution in chloroform at 25° C. Useful polyphenylene ether resins are described in U.S. Pat. Nos. 3,306,874 and 3,257,375, which are incorporated herein by reference.

In one or more embodiments, the pressure-sensitive adhesives based upon styrene block copolymers may also include an adhesive promoting resin or tackifying resin. In one or more embodiments, a hydrogenated tackifying resin is employed. These resins include, but are not limited to, petroleum resins, synthetic polyterpenes, resin esters and natural terpenes, and combinations thereof. In certain embodiments, the resin modifiers soften or become liquid at temperatures of about 40° C. to about 150° C. In certain embodiments, the resin modifiers have number average molecular weights, as measured by vapor phase osmometry, below that of the polymeric material included in the polymeric film. In certain embodiments, the number average molecular weights of the resin modifiers are less than about 5,000. In other embodiments, the number average molecular weights of the resin modifiers are less than about 1,000. In additional embodiments, the number average molecular weights of the resin modifiers are from about 500 to about 1000.

In certain embodiments, the resin modifiers have ring and ball softening point of about 20° C. to about 160° C. In additional embodiments, resin modifiers have ring and ball softening points of about 40° C. to about 160° C. In still other embodiments, resin modifiers have ring and ball softening points of about 50° C. to about 160° C.

Various types of natural and synthetic resins, alone or in admixture with each other, may be used be selected as the resin modifier. Suitable resins include, but are not limited to, natural rosins and rosin esters, hydrogenated rosins and hydrogenated rosin esters, coumarone-indene resins, petroleum resins, polyterpene resins, and terpene-phenolic resins. Specific examples of suitable petroleum resins include, but are not limited to, aliphatic hydrocarbon resins, hydrogenated aliphatic hydrocarbon resins, mixed aliphatic and aromatic hydrocarbon resins, hydrogenated mixed aliphatic and aromatic hydrocarbon resins, cycloaliphatic hydrocarbon resins, hydrogenated cycloaliphatic resins, mixed cycloaliphatic and aromatic hydrocarbon resins, hydrogenated mixed cycloaliphatic and aromatic hydrocarbon resins, aromatic hydrocarbon resins, substituted aromatic hydrocarbons, and hydrogenated aromatic hydrocarbon resins. As used herein, "hydrogenated" includes fully, substantially and at least partially hydrogenated resins. Suitable aromatic resins include aromatic modified aliphatic resins, aromatic modified cycloaliphatic resin, and hydrogenated aromatic hydrocarbon resins. Any of the above resins may be grafted with an unsaturated ester or anhydride to provide enhanced properties to the resin. For additional description of resin modifiers, reference can be made to technical literature, e.g., Hydrocarbon Resins, Kirk-Othmer, Encyclopedia of Chemical Technology, 4th Ed. v. 13, pp. 717-743 (J. Wiley & Sons, 1995).

In one or more embodiments, the tackifier resins include phenol-based resins. Included among the phenol-based resins are phenolic resins. These resins may include reactive phenol resins (also referred to as functionalized phenol resins), as well as unreactive resins. In one or more embodiments, the phenolic resin is a resole resin, which can be made by the condensation of alkyl, substituted phenols, or unsubstituted phenols with aldehydes such as formaldehyde in an alkaline medium or by condensation of bi-functional phenoldialcohols. In one or more embodiments, this condensation reaction occurs in the excess or molar equivalent of formaldehyde. In other embodiments, the phenolic resin may be formed by an acid-catalyzed reaction.

In one or more embodiments, the tackifier resin is a polybutene polymer or oligomer. In particular embodiments, polybutene oils are employed. Useful polybutene oils include high-viscosity oils that may be characterized by a viscosity at 100° C. of at least 80 cst, in other embodiments at least 100 cst, or in other embodiments at least 120 cst up to, for example, about 700 or 800 cst. In these or other embodiments, the high viscosity polybutene oils may be characterized by a molecular weight of at least 1000 g/mole, in other embodiments at least 1200 g/mole, or in other embodiments at least 1300 g/mole up to, for example, 1400 or 1500 g/mole. An exemplary high-viscosity polybutene oil is available under the tradename Indapol H300 (Ineos) or PB32 (Soltex).

In particular embodiments, the tackifying resins include hydrogenated rosins, esters of rosins, polyterpenes, terpene phenol resins, and polymerized mixed olefins. In one or more embodiments, these resins are liquids at room temperature.

Expandable Graphite

Expandable graphite may also be referred to as expandable flake graphite, intumescent flake graphite, or expandable flake; and, for the purposes herein, these terms may be used interchangeably.

In one or more embodiments, expandable graphite includes intercalated graphite in which an intercallant material is included between the graphite layers of graphite crystal or particle. Examples of intercallant materials include halogens, alkali metals, sulfates, nitrates, various organic acids, aluminum chlorides, ferric chlorides, other metal halides, arsenic sulfides, and thallium sulfides. In certain embodiments of the present invention, the expandable graphite includes non-halogenated intercallant materials. In certain embodiments, the expandable graphite includes sulfate intercallants, also referred to as graphite bisulfate. As is known in the art, bisulfate intercalation is achieved by treating highly crystalline natural flake graphite with a mixture of sulfuric acid and other oxidizing agents which act to catalyze the sulfate intercalation.

Commercially available examples of expandable graphite include HPMS Expandable Graphite (HP Materials Solutions, Inc., Woodland Hills, Calif.) and Expandable Graphite Grades 1721 (Asbury Carbons, Asbury, N.J.). Other commercial grades contemplated as useful in the present invention include 1722, 3393, 3577, 3626, and 1722HT (Asbury Carbons, Asbury, N.J.).

In one or more embodiments, the expandable graphite may be characterized as having a mean or average size in the range from about 30 μm to about 1.5 mm, in other embodiments from about 50 μm to about 1.0 mm, and in other embodiments from about 180 to about 850 μm. In certain embodiments, the expandable graphite may be characterized as having a mean or average size of at least 30 μm, in other embodiments at least 44 μm, in other embodiments at least 180 μm, and in other embodiments at least 300 μm. In one or more embodiments, expandable graphite may be characterized as having a mean or average size of at most 1.5 mm, in other embodiments at most 1.0 mm, in other embodiments at most 850 μm, in other embodiments at most 600 μm, in yet other embodiments at most 500 μm, and in still other embodiments at most 400 μm. Useful expandable graphite includes Graphite Grade #1721 (Asbury Carbons), which has a nominal size of greater than 300 μm.

In one or more embodiments, the expandable graphite may be characterized as having a median size in the range from about 30 μm to about 1.5 mm, in other embodiments from about 50 μm to about 1.0 mm, and in other embodiments from about 180 to about 850 μm. In certain embodiments, the expandable graphite may be characterized as having a median size of at least 30 μm, in other embodiments at least 44 μm, in other embodiments at least 180 μm, and in other embodiments at least 300 μm. In one or more embodiments, expandable graphite may be characterized as having a median size of at most 1.5 mm, in other embodiments at most 1.0 mm, in other embodiments at most 850 μm, in other embodiments at most 600 μm, in yet other embodiments at most 500 μm, and in still other embodiments at most 400 μm. Useful expandable graphite includes Graphite Grade #1721 (Asbury Carbons), which has a nominal size of greater than 300 μm.

In one or more embodiments of the present invention, the expandable graphite may be characterized as having a nominal particle size of 20×50 (US sieve). US sieve 20 has an opening equivalent to 0.841 mm and US sieve 50 has an opening equivalent to 0.297 mm. Therefore, a nominal particle size of 20×50 indicates the graphite particles are at least 0.297 mm and at most 0.841 mm.

In one or more embodiments, the expandable graphite may be characterized as having a carbon content in the range from about 70% to about 99%. In certain embodiments, the expandable graphite may be characterized as having a carbon content of at least 80%, in other embodiments at least 85%, in other embodiments at least 90%, in yet other embodiments at least 95%, in other embodiments at least 98%, and in still other embodiments at least 99% carbon.

In one or more embodiments, the expandable graphite may be characterized as having a sulfur content in the range from about 0% to about 8%, in other embodiments from about 2.6% to about 5.0%, and in other embodiments from about 3.0% to about 3.5%. In certain embodiments, the expandable graphite may be characterized as having a sulfur content of at least 0%, in other embodiments at least 2.6%, in other embodiments at least 2.9%, in other embodiments at least 3.2%, and in other embodiments 3.5%. In certain embodiments, the expandable graphite may be characterized as having a sulfur content of at most 8%, in other embodiments at most 5%, in other embodiments at most 3.5%.

In one or more embodiments, the expandable graphite may be characterized as having an expansion ratio (cc/g) in the range from about 10:1 to about 500:1, in other embodiments at least 20:1 to about 450:1, in other embodiments at least 30:1 to about 400:1, in other embodiments from about 50:1 to about 350:1. In certain embodiments, the expandable graphite may be characterized as having an expansion ratio (cc/g) of at least 10:1, in other embodiments at least 20:1, in other embodiments at least 30:1, in other embodiments at least 40:1, in other embodiments at least 50:1, in other embodiments at least 60:1, in other embodiments at least 90:1, in other embodiments at least 160:1, in other embodiments at least 210:1, in other embodiments at least 220:1, in other embodiments at least 230:1, in other embodiments at least 270:1, in other embodiments at least 290:1, and in yet other embodiments at least 300:1. In certain embodiments, the expandable graphite may be characterized as having an expansion ratio (cc/g) of at most 350:1, and in yet other embodiments at most 300:1.

In one or more embodiments, the expandable graphite, as it exists with the asphaltic component of the asphaltic sheet of the present invention, is partially expanded. In one or more embodiments, the expandable graphite is not expanded, however, to a deleterious degree, which includes that amount or more of expansion that will deleteriously the ability to form the sheet product and the ability of the graphite to serve as flame retardant at desirable levels, which include those levels that allow proper formation of the sheet. In one or more embodiments, the expandable graphite is expanded to at most 100%, in other embodiments at most 50%, in other embodiments at most 40%, in other embodiments at most 30%, in other embodiments at most 20%, and in other embodiments at most 10% beyond its original unexpanded size.

In one or more embodiments, the expandable graphite may be characterized as having a pH in the range from about 1 to about 10; in other embodiments from about 1 to about 6; and in yet other embodiments from about 5 to about 10. In certain embodiments, the expandable graphite may be characterized as having a pH in the range from about 4 to about 7. In one or more embodiments, the expandable graphite may be characterized as having a pH of at least 1, in other embodiments at least 4, and in other embodiments at least 5. In certain embodiments, the expandable graphite may be characterized as having a pH of at most 10, in other embodiments at most 7, and in other embodiments at most 6.

In one or more embodiments, the expandable graphite may be characterized by an onset temperature ranging from about 100° C. to about 280° C.; in other embodiments from about 160° C. to about 225° C.; and in other embodiments from about 180° C. to about 200° C. In one or more embodiments, the expandable graphite may be characterized by an onset temperature of at least 100° C., in other embodiments at least 130° C., in other embodiments at least 160° C., and in other embodiments at least 180° C. In one or more embodiments, the expandable graphite may be characterized by an onset temperature of at most 250° C., in other embodiments at most 225° C., and in other embodiments at most 200° C. Onset temperature may also be interchangeably referred to as expansion temperature; it may also be referred to as the temperature at which expansion of the graphite starts.

Complementary Flame Retardants

As mentioned above, the expandable graphite may be used in conjunction with a complementary flame retardant. In other words, the complementary flame retardants are dispersed, along with the expandable graphite, throughout the matrix of the pressure-sensitive adhesive composition. These flame retardants may include any compound that increases the burn resistivity, particularly flame spread such as tested by UL 94 and/or UL 790, in the polymeric compositions of the present invention. Generally, useful flame retardants include those that operate by forming a char-layer across the surface of a specimen when exposed to a flame. Other flame retardants include those that operate by releasing water upon thermal decomposition of the flame retardant compound. Useful flame retardants may also be categorized as halogenated flame retardants or non-halogenated flame retardants.

Exemplary non-halogenated flame retardants include magnesium hydroxide, aluminum trihydrate, zinc borate, ammonium polyphosphate, melamine polyphosphate, and antimony oxide ($Sb_2O_3$). Magnesium hydroxide ($Mg(OH)_2$) is commercially available under the tradename Vertex™ 60, ammonium polyphosphate is commercially available under the tradename Exolite™ AP 760 (Clarian), which is sold together as a polyol masterbatch, melamine polyphosphate is available under the tradename Budit™ 3141 (Budenheim), and antimony oxide ($Sb_2O_3$) is commercially available under the tradename Fireshield™.

Examples of other complementary calcium borate, magnesium hydroxide, basic magnesium carbonate, aluminum trihydrate, zinc borate, gypsum, and mixtures thereof. In these or other embodiments, the complementary flame retardant includes colemanite, which is a borate mineral that is believed to include about 50-80% calcium borate.

Amounts

In one or more embodiments, the pressure-sensitive adhesive composition of the present invention includes at least 1, in other embodiments at least 2, in other embodiments at least 3, and in other embodiments at least 5 percent by weight expandable graphite based upon the entire weight of pressure-sensitive adhesive composition. In these or other embodiments, the pressure-sensitive adhesive composition of the present invention includes at most 35, in other embodiments at most 15, and in other embodiments at most 12 percent by weight expandable graphite based upon the entire weight of the pressure-sensitive adhesive composition. In one or more embodiments, the pressure-sensitive adhesive composition of the present invention includes from about 1 to about 20, in other embodiments from about 2 to about 15, and in other embodiments from about 3 to about 12 percent by weight expandable graphite based on the entire weight of the pressure-sensitive adhesive composition.

In one or more embodiments, the pressure-sensitive adhesive composition of the present invention includes at least 1, in other embodiments at least 3, in other embodiments at least 5, and in other embodiments at least 7 percent by weight complementary flame retardant based upon the entire weight of pressure-sensitive adhesive composition. In these or other embodiments, the pressure-sensitive adhesive composition of the present invention includes at most 30, in other embodiments at most 25, and in other embodiments at most 15 percent by weight complementary flame retardant based upon the entire weight of the pressure-sensitive adhesive composition. In one or more embodiments, the pressure-sensitive adhesive composition of the present invention includes from about 1 to about 95, in other embodiments from about 3 to about 20, and in other embodiments from about 5 to about 15 percent by weight complementary flame retardant based on the entire weight of the pressure-sensitive adhesive composition.

Preparation of Pressure-Sensitive Adhesive Composition

In one or more embodiments, the pressure-sensitive adhesive composition may generally be prepared by using conventional techniques for forming these compositions. In general, and as those skilled in the art appreciate, the various constituents of the adhesive compositions may be introduced and mixed at elevated temperatures. For example, the constituents may be mixed at temperatures of at least 260° F. (127° C.), in other embodiments at least 300° F. (149° C.), and in other embodiments at least 320° F. (160° C.). In these or other embodiments, the constituents may be introduced and mixed at temperatures below 400° F. (204° C.), in these or other embodiments below 390° F. (199° C.), and in other embodiments below 380° F. (193° C.).

In one or more embodiments, the pressure-sensitive adhesive compositions of the present invention are prepared by employing a two-stage mixing process. For example, all of the constituents of the adhesive composition, except for the expandable graphite, are first mixed. By mixing the constituents excluding the expandable graphite in a first mixing step, the temperature at which the constituents may be mixed can be increased to achieve greater dispersion and/or mixing of the constituents without triggering expansion of the expandable graphite. Once these constituents are mixed at a higher temperature (which will form a premixture), the composition can be cooled and the expandable graphite can then be introduced to the premixture and further mixing may take place to disperse the expandable graphite within the pressure-sensitive adhesive composition at an appropriate temperature.

In other embodiments, the adhesive composition is devoid or substantially devoid of expandable graphite. In these embodiments, the expandable graphite is incorporated into the adhesive sheet downstream. For example, the expandable graphite can be dropped onto a sheet of adhesive.

In yet other embodiments, the expandable graphite is included in the adhesive composition prior to formation of the solid pressure sensitive adhesive body, and the expandable graphite may also be incorporated into the adhesive downstream (e.g. by dropping the expandable graphite onto a sheet of adhesive).

In one or more embodiments, expandable graphite particles are dropped on to a sheet of molten adhesive, wherein the adhesive may or may not include expandable graphite. These particles are dropped at a rate and amount to create at least a partial layer of expandable graphite particles adjacent to the adhesive sheet. In one or more embodiments, the act of dropping the expandable graphite particles on to an adhesive sheet may at least partially embed some of the graphite particles in to the adhesive such that the adhesive serves as a binder to hold the graphite particles in place. In these or other embodiments, one or more of the plurality of expandable graphite particles are adhered to the surface of the adhesive sheet by way of the adhesive properties of the adhesive material. In one or more embodiments, the step of dropping the expandable graphite creates a concentration gradient of the expandable graphite and the adhesive.

In one or more embodiments, the process of dropping expandable graphite particles on to an adhesive sheet takes place after the adhesive sheet is prepared and prior to a substantial cooling of the adhesive material so as to take advantage of the adhesive properties of the adhesive. In one or more embodiments, at least a portion of the expandable graphite particles are dropped on or otherwise applied to an adhesive sheet within 15 seconds, in other embodiments within 10 seconds, and in other embodiments within 5 seconds of the adhesive sheet being prepared. In one or more embodiments, the expandable graphite is dropped on the adhesive sheet prior to solidification of the adhesive material (e.g. prior to the adhesive sheet cooling to a temperature below about 85° C.

In one or more embodiments, the expandable graphite particles are applied to the surface of an adhesive sheet using a multi-stage process. For example, a multi-stage process may include multiple drops of graphite particles. In certain embodiments, the various stages or drops can be configured to achieve certain characteristics. For example, different sized expandable graphite particles can be dropped at different stages in order to achieve desirable coverage of the surface of the adhesive sheet.

In one or more embodiments, additional adhesive material applied to the sheet after application of the expandable graphite (e.g. after dropping the expandable graphite onto the sheet, which can form the layer of expandable graphite or concentrated region of expandable graphite). This may take place by using curtain coating or roll coating techniques. In other embodiments, the expandable graphite is dropped onto the adhesive sheet prior to the sheet being calendered or sized within a nip roll. As a result, then the sheet is calendered or sized within a nip roll, the excess adhesive material at the nip roll will serve to form a layer (or skin) of adhesive material over the layer of expandable graphite.

In certain embodiments, a polymeric layer is applied to the adhesive sheet after application of the expandable graphite particles. For example, following one or more drops or applications of the expandable graphite particles to a surface of the adhesive sheet, a polymeric film may be applied over the expandable graphite particles. In one or more embodiments, this may facilitate subsequent calendaring of the adhesive sheet carrying the expandable graphite particles. In other embodiments, the layer of expandable graphite particles may be modified by the application of a release agent, such as sand, silica, or talc, over the expandable graphite particles. The presence of release agents may, like the polymeric film, facilitate subsequent calendaring of the adhesive sheet.

Structure of Adhesive Layer

In one or more embodiments, the structure of the adhesive layer relative to the expandable graphite can be modified. In one or more embodiments, the expandable graphite is dispersed throughout the adhesive. Depending on mixing, the dispersion of the expandable graphite may be generally homogeneous. In other embodiments, the degree of dispersion may be referred to as random.

In other embodiments, the expandable graphite may be in the form of a layer or concentrated region within or adjacent to the adhesive. For example, and with reference to FIG. 3, adhesive layer 54 includes one or more layers 60 of particles of expandable graphite. These particles may be held in place by a matrix of adhesive composition present within at least a portion of adhesive layer 54. In these or other embodiments, the expandable graphite is held in place by being adhered to the surface of sheet 12. In one or more embodiments, adhesive layer 54 may also include expandable graphite dispersed therein. In other words, the adhesive layer includes both a layer or region 60 having a high concentration of expandable graphite and it has expandable graphite dispersed throughout the matrix of the adhesive. While a continuous layer or region (e.g. layer 54) is believed to be advantageous, it is also contemplated that the adhesive layer 54 can include multiple discreet regions of the expandable graphite, such as may exist in a pattern where the expandable graphite is applied on the top of the asphaltic sheet in rows or strips in the machine direction of the sheet.

In one or more embodiments, the thickness of the layer of expandable graphite may be at least 10 μm, in other embodiments at least 20 μm, in other embodiments at least 30 μm, in other embodiments at least 75 μm, and in other embodiments at least 100 μm. In these or other embodiments, the thickness of the layer of expandable graphite may be at most 3 mm, in other embodiments at most 2 mm, and in other embodiments at most 1 mm. In one or more embodiments, the thickness of the layer of expandable graphite may be from about 10 μm to about 3 mm, in other embodiments from about 75 μm to about 2 mm, and in other embodiments from about 100 μm to about 1 mm.

In one or more embodiments, the layer of expandable graphite particles may be covered by a layer of adhesive. Stated another way, the layer or region of concentrated expandable graphite may be embedded within the adhesive material.

In one or more embodiments, the thickness of the adhesive layer over the layer of expandable graphite particles may be at least 2 μm, in other embodiments at least 5 μm, and in other embodiments at least 20 μm. In these or other embodiments, the thickness of the adhesive layer over the layer of expandable graphite particles may be at most 1 mm, in other embodiments at most 0.5 mm, in other embodiments at most 0.25 mm, in other embodiments at most 0.1 mm, and in other embodiments at most 0.050 mm. In one or more embodiments, the thickness of the adhesive layer over the layer of expandable graphite particles may be from about 1 μm to about 3 mm, in other embodiments from about 2 μm to about 0.5 mm, and in other embodiments from about 5 μm to about 0.050 mm.

In one or more embodiments, as shown in FIGS. 1 through 4, the adhesive layer 14 (also 34, 54, and 74) may include a planar region within the membrane, moisture barrier, underlayment, or tape that includes a higher concentration of expandable graphite relative to any other region of the article. Thus, layer 14 may include a continuous layer of expandable graphite having a variable or relatively constant thickness across the membrane, moisture barrier, underlayment, or tape. Or, in other embodiments, the expandable graphite may be discontinuous throughout the region so long as the concentration of expandable graphite within the region is higher than in other areas or regions of membrane, moisture barrier, underlayment, or tape. In one or more embodiments, the discontinuity of the expandable graphite within the layer 14 (also 34, 54, and 74) may result from the adhesive composition which may form a matrix in which the expandable graphite is at least partially dispersed within this region or layer. While the expandable graphite may be dispersed uniformly within the adhesive layer, it should also be appreciated that the concentration of the expandable graphite may not be constant within this layer. Indeed, as will be appreciated from the description of how to fabricate the articles of the embodiments herein, a concentration gradient may exist whereby the concentration of the expandable graphite moves from a region of maximum concentration to a region of decreased concentration.

Figure 2:
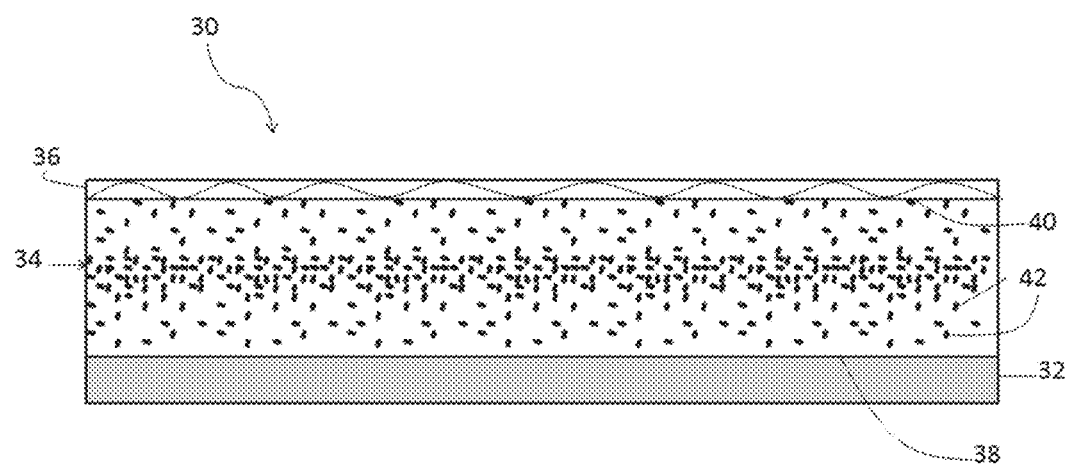
FIG. 2 is a cross-sectional view of a moisture barrier according to one or more embodiments of the invention.

As shown in expanded view in FIG. 2, the concentration of expandable graphite 42 approximately equidistant from planar surfaces 38 and 40 within layer 34 is the highest, which corresponds to a minimum in adhesive composition concentration. On the other hand, the concentration of expandable graphite 42 proximate to planar surfaces 38 and 40 are at a minimum relative to the concentration of expandable graphite within layer 34.

Figure 3:
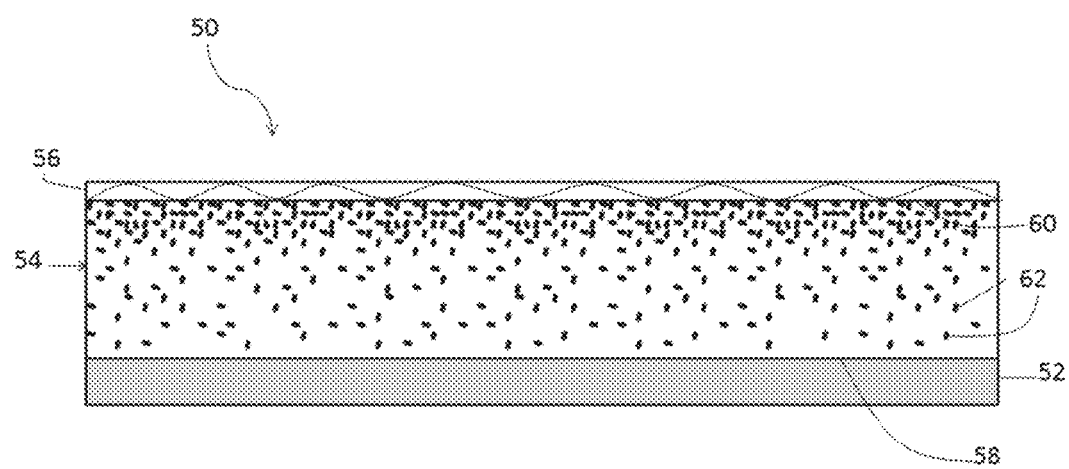
FIG. 3 is a cross-sectional view of an underlayment according to one or more embodiments of the invention.

As shown in expanded view in FIG. 3, the concentration of expandable graphite 62 approximately furthest from planar surface 58 within layer 54 is the highest, which corresponds to a minimum in adhesive composition concentration. On the other hand, the concentration of expandable graphite 62 proximate to planar surface 58 is at a minimum relative to the concentration of expandable graphite within layer 54.

INDUSTRIAL APPLICABILITY

In one or more embodiments, the pressure-sensitive adhesive compositions of the present invention, which include expandable graphite, are advantageously employed in combination with construction materials. As a result, the pressure-sensitive adhesive compositions not only provide a means by which construction materials can be adhered to a substrate, but they also provide the construction materials with increased flame and/or fire resistance.

Fully Adhered Roofing System

In one or more embodiments, the construction material is a roofing membrane to which the pressure-sensitive adhesive composition is adhered, thereby providing a mechanism by which the membrane can be adhered to another building material, such as an adjacent membrane or a substrate. In particular embodiments, the pressure-sensitive adhesive composition of the present invention is applied to a surface of the membrane in a manner that will allow the membrane to be installed as a fully-adhered roofing system. Those skilled in the art appreciate that fully-adhered roofing systems include those systems wherein the membrane is adhered to the roof substrate substantially across the entire planar surface of the membrane contacting the substrate.

With reference to FIG. 1, membrane 11 includes a water-impermeable sheet 12, adhesive layer 14, and optional release liner 16. Adhesive layer 14 is adhered to sheet 12 across a first planar surface 18 of sheet 12 by application of the pressure-sensitive adhesive composition to the sheet. For example, and as will be described in greater detail below, where the pressure-sensitive adhesive composition is a hot-melt, hot application of the pressure-sensitive adhesive composition to the membrane forms layer 14, which is adhered to sheet 12. Release liner 16 is applied to adhesive layer 14 on a planar surface 20 of adhesive layer 14 opposite sheet 12.

In one or more embodiments, the thickness of adhesive layer 14 on sheet 12 is from about 2 mils (0.05 mm) to about 90 mils (2.3 mm), in other embodiments from about 3 mils (0.08 mm) to about 50 mils (1.3 mm), and in other embodiments from about 5 mils (0.13 mm) to about 50 mils (1.3 mm) in thickness.

In one or more embodiments, water-impermeable sheet 12, which may also be referred to as membrane 12, may be a thermoset material. In other embodiments the membrane may be a thermoformable material. In one or more embodiments, the membrane may be EPDM based. In other embodiments, the membrane may be plastic based. In these or other embodiments, the membrane may be flexible and capable of being rolled up for shipment. In these or other embodiments, the membrane may include fiber reinforcement, such as a scrim. In one or more embodiments, the membrane includes EPDM membranes including those that meet the specifications of the ASTM D-4637. In other embodiments, the membrane includes thermoplastic membranes including those that meet the specifications of ASTM D-6878-03.

In one or more embodiments, the thickness sheet or membrane 12 is from about 20 mils (0.51 mm) to about 100 mils (2.54 mm), in other embodiments from about 30 mils (0.76 mm) to about 90 mils (2.3 mm), and in other embodiments from about 40 mils (1.0 mm) to about 80 mils (2.0 mm) in thickness.

Referring again to FIG. 1, in one or more embodiments, optional release liner 16 is positioned over adhesive layer 14 to prevent contaminants from contacting and collecting on adhesive layer 14. The tackiness of adhesive layer 14 holds release liner 16 in place. Release liner 16 may include a thin film or coating to which the adhesive may form a temporary bond. However, this bond can be readily broken by applying minimal tension. Release liner 16 may advantageously provide protection to adhesive layer 14 during storage or shipment, and may remain in place until a roof mechanic removes it during rooftop membrane installation prior to installation of the membrane. In one or more embodiments, release liner 16 may be between approximately 1 mil (0.02 mm) and 9 mils (0.23 mm) in thickness, in other embodiments between approximately 1 mil (0.02 mm) and 7 mils (0.18 mm) in thickness, in still other embodiments between approximately 2 mils (0.05 mm) and 6 mils (0.15 mm) in thickness, and in yet other embodiments between approximately 2 mils (0.05 mm) and 4 mils (0.10 mm) in thickness.

In one or more embodiments, release liner 16 may include a paper or cellulosic structure coated with a polymeric coating. In other embodiments, release liner 16 may include a homogeneous polymeric structure; for example, release liner 16 may include a polyester or polyolefin film. Suitable materials for release liner 16 include polypropylene, polyester, high-density polyethylene, medium-density polyethylene, low-density polyethylene, polystyrene or high-impact polystyrene. Such polymeric materials offer a number of advantageous properties, including high moisture resistance, good resistance to temperature fluctuations during processing and storage, high tear resistance. In one or more embodiments, these release liners may also be provided with anti-static surface coatings. In addition to the above polymeric release liner materials, release liner 16 may also be made of kraft paper.

Thus membrane assembly 11 includes a factory-applied adhesive and that is covered and protected by an optional release liner. By applying the pressure-sensitive adhesive in a controlled factory environment, contamination is minimized. Further, factory application of pressure-sensitive adhesive 14 allows for additional safety precautions during the "flash-off" period. Specifically, proper ventilation may be ensured so that the exposure of workers to harmful fumes is prevented. Further, this method allows metered application of the primer and enables more effective and standardized scrubbing and preparation of the membrane.

In one or more embodiments, the pressure-sensitive adhesive can be applied to the membrane in the form of a hot-melt adhesive. As those skilled in the art appreciate, the pressure-sensitive adhesive composition, in the form of a hot melt, can be heated above its melt point and applied to the membrane in the form of a thin-film extrudate.

In other embodiments, the pressure-sensitive adhesive is applied to the membrane in the form of a liquid that is permitted to dry and/or cure to thereby leave a solids residue of the pressure sensitive adhesive.

Moisture Barrier

In yet another embodiment, the pressure-sensitive adhesive is applied to a substrate to form a moisture, vapor and/or air barrier having improved flame-resistant and/or fire-resistant properties. As those skilled in the art may appreciate, these moisture barriers may be employed in cavity wall systems to provide both moisture and vapor barrier properties.

In one or more embodiments, the substrate to which the adhesive is applied may have a thickness of between approximately 1 mil (0.03 mm) and 20 mils (0.51 mm) in thickness, in other embodiments between approximately 2 mils (0.05 mm) and 15 mils (0.38 mm) in thickness, and in still other embodiments between approximately 3 and 10 mils in thickness.

In one or more embodiments, the thickness of the adhesive layer on polymeric sheet substrate may from about 2 to about 90 mils, in other embodiments from about 3 mils (0.08 mm) to about 50 mils (1.3 mm), and in other embodiments from about 5 mils (0.13 mm) to about 50 mils (1.3 mm) in thickness.

In one or more embodiments, the substrate to which the pressure-sensitive adhesive can be applied is polymeric sheet or film (e.g. polymeric extrudate) that includes or is prepared from, for example, polyethylene, polypropylene, copolymers of ethylene and propylene, and polyester. In or more embodiments, the polymeric sheet or film is a polypropylene sheet. In other embodiments, the substrate to which the adhesive composition is applied is a foil metal such as aluminum foil. In one or more embodiments, these foils may include fabric reinforcement. In still other embodiments, the substrate to which the adhesive composition is applied is a fabric such as a synthetic fiber (e.g. polyolefin or polyester non-woven fiber fabric). In yet other embodiments, the substrate to which the adhesive composition is applied is a paper-reinforced foil.

With reference to FIG. 2, moisture barrier 30 includes a water-impermeable sheet 32, adhesive layer 34, and optional release liner 36. Adhesive layer 34 is adhered to sheet 32 across a first planar surface 38 of sheet 32 by application of the pressure-sensitive adhesive composition to the sheet. Expandable graphite particles 42 are dispersed within the adhesive layer 34. Release liner 36 is applied to adhesive layer 34 on a planar surface 40 of adhesive layer 34 opposite water-impermeable sheet 32. The expandable graphite may be uniformly or non-uniformly dispersed. It will further be appreciated that the expandable graphite may be dispersed with a concentration gradient as depicted in FIG. 2 wherein the highest concentration of expandable graphite is positioned approximately equidistant from planar surfaces 38 and 40 within adhesive layer 34, or alternatively the expandable graphite may be dispersed with a concentration gradient as depicted in FIG. 3 wherein the highest concentration of expandable graphite is positioned furthest from planar surface 58 within layer adhesive 54, or a combination of gradients therein.

Underlayment

In still other embodiments, the pressure-sensitive adhesive is applied to a substrate to form an underlayment having improved flame-resistant and/or fire-resistant properties. As those skilled in the art may appreciate, these underlayments may be employed in a variety of roofing systems, such as metal roof systems, to provide increased flame and/or fire resistance. In one or more embodiments, the underlayment prepared according to one or more embodiments of the present invention meet the standards of ASTM D1970.

In one or more embodiments, the thickness of the adhesive layer applied to the substrate of the underlayment may be from about 2 mils (0.05 mm) to about 90 mils (2.3 mm), in other embodiments from about 3 mils (0.07 mm) to about 50 mils (1.3 mm), and in other embodiments from about 5 mils (0.13 mm) to about 50 mils (1.3 mm) in thickness.

In one or more embodiments, the substrate to which the adhesive is applied to form the underlayment may have a thickness of between approximately 1 and 20 mils (0.51 mm) in thickness, in other embodiments between approximately 2 mils (0.05 mm) and 15 mils (0.39 mm) in thickness, and in still other embodiments between approximately 3 mils (0.07 mm) and 10 mils (0.25 mm) in thickness.

In one or more embodiments, the substrate to which the pressure-sensitive adhesive can be applied to form the underlayment may be polymeric sheet or film (e.g. polymeric extrudate) that includes or is prepared from, for example, polyethylene, polypropylene, copolymers of ethylene and propylene, and polyester. In or more embodiments, the polymeric sheet or film is a polypropylene sheet. In particular embodiments, the polymeric substrate is surface textured to provide a surface that is not smooth. In other embodiments, the substrate to which the adhesive composition is applied to form an underlayment is a foil metal such as aluminum foil. In one or more embodiments, these foils may include fabric reinforcement. In still other embodiments, the substrate to which the adhesive composition is applied to form an underlayment is a fabric such as a synthetic fiber (e.g. polyolefin or polyester non-woven fiber fabric).

With reference to FIG. 3, underlayment 50 includes a water-impermeable sheet 52, adhesive layer 54, and optional release liner 56. Adhesive layer 54 is adhered to sheet 52 across a first planar surface 58 of sheet 52 by application of the pressure-sensitive adhesive composition to the sheet. Expandable graphite particles 62 are dispersed within the adhesive layer 54. Release liner 56 is applied to adhesive layer 54 on a planar surface 60 of adhesive layer 54 opposite water-impermeable sheet 52. The expandable graphite may be uniformly or non-uniformly dispersed. It will further be appreciated that the expandable graphite may be dispersed with a concentration gradient as depicted in FIG. 2 wherein the highest concentration of expandable graphite is positioned approximately equidistant from planar surfaces 38 and 40 within adhesive layer 34, or alternatively the expandable graphite may be dispersed with a concentration gradient as depicted in FIG. 3 wherein the highest concentration of expandable graphite is positioned furthest from planar surface 58 within layer adhesive 54, or a combination of gradients therein.

Tape

In yet other embodiments, the present invention provides a pressure-sensitive tape carrying release liners on opposing planar surfaces of the adhesive body, which may be in the form of a sheet. The pressure-sensitive adhesive body includes expandable graphite according to embodiments of this invention. In one or more embodiments, the expandable graphite may be dispersed throughout the adhesive body. In other embodiments, the expandable graphite may be concentrated in a layer or region within the adhesive body. In yet other embodiments, the expandable graphite may be both dispersed throughout the adhesive body and located within a region or body having a concentrated amount of expandable graphite.

As with other embodiments of the invention, the pressure-sensitive adhesive tape includes release liners that may be formed from a polymeric film or a coated paper. The polymeric film may include polyolefin films, and the coated paper may include kraft paper coated with polysiloxanes or fluoropolymers.

Figure 4:
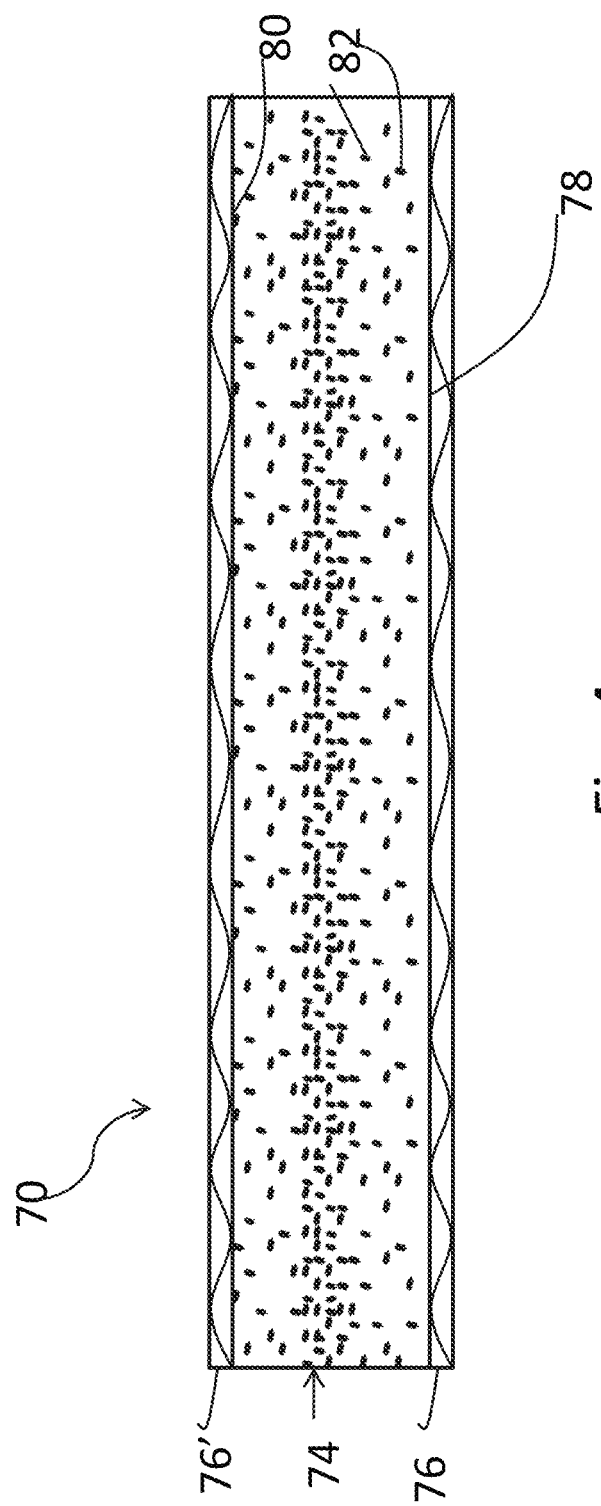
FIG. 4 is a cross-sectional view of a tape according to one or more embodiments of the invention.

An exemplary tape may be described with reference to FIG. 4, which depicts tape 70 having planar shaped adhesive body 74, first release liner 76, and second release liner 76'. Expandable graphite particles 82 are dispersed within the planar shaped adhesive body 74. First release liner 76 and second release liner 76' are removably attached to adhesive body 74. The expandable graphite may be uniformly or non-uniformly dispersed. It will further be appreciated that the expandable graphite may be dispersed with a concentration gradient as depicted in FIG. 2 wherein the highest concentration of expandable graphite is positioned approximately equidistant from planar surfaces 38 and 40 within adhesive layer 34, or alternatively the expandable graphite may be dispersed with a concentration gradient as depicted in FIG. 3 wherein the highest concentration of expandable graphite is positioned furthest from planar surface 58 within layer adhesive 54, or a combination of gradients therein.

Various modifications and alterations that do not depart from the scope and spirit of this invention will become apparent to those skilled in the art. This invention is not to be duly limited to the illustrative embodiments set forth herein.

What is claimed is:

1. A method of preparing a building material, the method comprising the steps of:
   i. providing a polymeric sheet having first and second planar surfaces;
   ii. extruding a hot-melt pressure-sensitive adhesive to provide a pressure-sensitive adhesive sheet having first and second planar surfaces;
   iii. dropping expandable graphite on to the first planar surface of the pressure-sensitive adhesive sheet; and
   iv. applying the first planar surface of the pressure-sensitive adhesive sheet to the second planar surface of the polymeric sheet.

2. The method of claim 1 further comprising the step of applying a release liner to the second planar surface of the pressure-sensitive adhesive sheet.

3. The method of claim 1 wherein the hot-melt pressure-sensitive adhesive includes a polystyrene block copolymer.

4. The method of claim 1 wherein the hot-melt pressure-sensitive adhesive includes butyl rubber.

5. The method of claim 1 wherein the step of applying the first planar surface of the pressure-sensitive adhesive sheet to the second planar surface of the polymeric sheet forms an interface where the pressure-sensitive adhesive sheet contacts the second planar surface of the polymeric sheet.

6. The method of claim 5, wherein the step of dropping the expandable graphite on the first planar surface of the pressure-sensitive adhesive sheet forms a concentrated region of the expandable graphite proximate the interface.

7. The method of claim 1 wherein the hot-melt pressure-sensitive adhesive is an extrudable hot-melt pressure-sensitive adhesive.

8. The method of claim 7 further comprising the step of applying a release liner to the pressure-sensitive adhesive sheet.

* * * * *